United States Patent
Yoshida et al.

(10) Patent No.: US 11,802,348 B2
(45) Date of Patent: Oct. 31, 2023

(54) METHOD FOR SELECTIVELY COATING ELECTRONIC COMPONENT WITH COATING MATERIAL, AND METHOD FOR MANUFACTURING ELECTRONIC COMPONENT

(71) Applicants: Murata Manufacturing Co., Ltd., Nagaokakyo (JP); NATIONAL UNIVERSITY CORPORATION KYOTO INSTITUTE OF TECHNOLOGY, Kyoto (JP)

(72) Inventors: Yasushi Yoshida, Nagaokakyo (JP); Tatsuya Fukutani, Nagaokakyo (JP); Tatsuo Kunishi, Nagaokakyo (JP); Masahiko Minoda, Kyoto (JP); Ryota Mori, Osaka (JP)

(73) Assignees: MURATA MANUFACTURING CO., LTD., Nagaokakyo (JP); NATIONAL UNIVERSITY CORPORATION KYOTO INSTITUTE OF TECHNOLOGY, Kyoto (JP)

( * ) Notice: Subject to any disclaimer, the term of this patent is extended or adjusted under 35 U.S.C. 154(b) by 871 days.

(21) Appl. No.: 16/448,099

(22) Filed: Jun. 21, 2019

(65) Prior Publication Data

US 2019/0304684 A1    Oct. 3, 2019

Related U.S. Application Data

(63) Continuation of application No. PCT/JP2017/046149, filed on Dec. 22, 2017.

(30) Foreign Application Priority Data

Dec. 27, 2016  (JP) .................................. 2016-252395

(51) Int. Cl.
  *H01G 4/12*      (2006.01)
  *C25D 5/00*      (2006.01)
  (Continued)

(52) U.S. Cl.
  CPC .............. *C25D 5/627* (2020.08); *C04B 41/85* (2013.01); *C04B 41/91* (2013.01); *C09D 163/00* (2013.01);
  (Continued)

(58) Field of Classification Search
  CPC .......... H01G 4/13; H01G 4/224; H01G 4/232; H01G 4/30; H01G 13/00; B05D 1/18; B05D 3/10; B05D 5/12
  (Continued)

(56) References Cited

U.S. PATENT DOCUMENTS 6,171,644 B1 *  1/2001  Jinno ....................... H01C 7/18
                                                      29/613
6,381,117 B1 *  4/2002  Nakagawa ............... H01G 2/14
                                                      361/306.3
(Continued)

FOREIGN PATENT DOCUMENTS

JP    H08255701 A    10/1996
JP    H10223407 A    8/1998
(Continued)

OTHER PUBLICATIONS

International Search Report issued for PCT/JP2017/046149, dated Mar. 13, 2018.
(Continued)

*Primary Examiner* — Brian K Talbot
(74) *Attorney, Agent, or Firm* — ArentFox Schiff LLP

(57) ABSTRACT

An element body has an exposed surface including a selective surface material which is to be coated with the coating material and a non-selected surface material which is not to (Continued)

be coated with the coating material. The selected surface material has different material properties than the non-selected surface material. The element body is coated with the coating material by applying a surface modifier only on the surface of the selected surface material and thereafter coating the surface of the selected surface material to which the surface modifier has been applied with the coating material.

12 Claims, 10 Drawing Sheets

(51) Int. Cl.

| | |
|---|---|
| C04B 41/85 | (2006.01) |
| C04B 41/91 | (2006.01) |
| C09D 163/00 | (2006.01) |
| C25D 5/02 | (2006.01) |
| H01G 4/224 | (2006.01) |
| H01G 4/232 | (2006.01) |
| H01G 4/30 | (2006.01) |
| H01G 13/00 | (2013.01) |
| C25D 5/12 | (2006.01) |
| B05D 3/10 | (2006.01) |
| B05D 1/18 | (2006.01) |
| B05D 5/12 | (2006.01) |

(52) U.S. Cl.
CPC ............... *C25D 5/022* (2013.01); *C25D 5/12* (2013.01); *H01G 4/12* (2013.01); *H01G 4/224* (2013.01); *H01G 4/232* (2013.01); *H01G 4/30* (2013.01); *H01G 13/00* (2013.01); *B05D 1/18* (2013.01); *B05D 3/10* (2013.01); *B05D 5/12* (2013.01)

(58) Field of Classification Search
USPC ........................................ 427/256, 98.4, 98.5
See application file for complete search history.

(56) References Cited

U.S. PATENT DOCUMENTS

| | | | | |
|---|---|---|---|---|
| 6,841,191 | B2* | 1/2005 | Wu | ................... C25D 5/022 29/613 |
| 7,463,474 | B2* | 12/2008 | Ritter | ...................... H01G 4/30 361/306.3 |
| 7,939,453 | B2* | 5/2011 | Kano | .................. H01L 51/0012 438/149 |
| 8,587,923 | B2* | 11/2013 | Ogawa | ..................... H01G 4/30 361/306.3 |
| 9,704,649 | B2* | 7/2017 | Saito | ...................... H01G 2/103 |
| 9,997,293 | B2* | 6/2018 | Inoue | ..................... H01C 17/00 |
| 10,236,124 | B2* | 3/2019 | Masunari | ............. H05K 3/3442 |
| 10,879,005 | B2* | 12/2020 | Maki | ........................ H03H 1/00 |
| 11,170,935 | B2* | 11/2021 | Iso | ......................... H01F 41/046 |
| 2004/0156912 | A1* | 8/2004 | Kawamura | .............. B05D 7/26 424/489 |
| 2006/0234022 | A1* | 10/2006 | Liu | ...................... H01G 4/2325 361/306.3 |
| 2008/0151470 | A1* | 6/2008 | Motoki | .................... H01G 4/30 361/303 |
| 2012/0223798 | A1 | 9/2012 | Wei | |
| 2014/0128505 | A1* | 5/2014 | Hamada | ............... C08G 59/688 523/400 |
| 2016/0024346 | A1 | 1/2016 | Inoue et al. | |

FOREIGN PATENT DOCUMENTS

| | | |
|---|---|---|
| JP | 2001044069 A | 2/2001 |
| JP | 2004015016 A | 1/2004 |
| JP | 2014165184 A | 9/2014 |
| JP | 2016031988 A | 3/2016 |
| JP | 2016171236 A | 9/2016 |

OTHER PUBLICATIONS

Written Opinion of the International Searching Authority issued for PCT/JP2017/046149, dated Mar. 13, 2018.

* cited by examiner

METHOD FOR SELECTIVELY COATING ELECTRONIC COMPONENT WITH COATING MATERIAL, AND METHOD FOR MANUFACTURING ELECTRONIC COMPONENT

CROSS REFERENCE TO RELATED APPLICATIONS

The present application is a continuation of International application No. PCT/JP2017/046149, filed Dec. 22, 2017, which claims priority to Japanese Patent Application No. 2016-252395, filed Dec. 27, 2016, the entire contents of each of which are incorporated herein by reference.

TECHNICAL FIELD

The present invention relates to a method for selectively coating an electronic component with a coating material, and more specifically relates to a high productivity method for selectively coating an electronic component with a coating material, which makes it possible to comprehensively coat element bodies of many electronic components with the coating material.

Also, the present invention relates to a high productivity method for manufacturing the electronic component using the method for selectively coating an electronic component with a coating material according to the present invention.

BACKGROUND ART

For various industrial products, a surface of an element body should be partially coated with a coating material having a particular function, in some cases. For example, in an electronic component as an example of an industrial product, portions excluding electrodes on a surface of an element body should be coated with a coating material made of resin, glass or the like, in some cases. By way of example, it might be desirable to coat the outer surface (excluding electrodes on the outer surface) of an electric body such as a capacitor, a thermistor, a coil or a resistor with a coating material made of resin, glass or the like.

There are various reasons to do this the coating material to be applied may have various functions. For example, an electronic component is coated with a coating material in order to develop electric insulation, enhance moisture resistance, enhance environmental resistance (chemical resistance etc.), and enhance mechanical strength, in some cases. Alternatively, a coating material is applied in order to enhance heat dissipation, or conversely, enhance heat-retaining property, in some cases. Alternatively, a coating material is applied for the purpose of coloring in order to identify types, prevent contamination, and provide designability, etc. in some cases. On the other hand, when an electrically insulating coating material adheres to an electrode in an electronic component, conductivity is decreased, and therefore adhesion of the coating material to the electrode should be avoided.

It is relatively easy to coat an entire surface of an element body with a single coating material. For example, it is enough to immerse an element body entirely in a liquid coating material and then raise the element body. In contrast, it is not easy to partially coat a surface of an element body with a coating material.

For example, JP 2001-44069 A (Patent Literature 1) discloses a multilayer capacitor partially coated with a glass coat layer (coating material). More specifically, the multilayer capacitor of Patent Literature 1 includes a rectangular parallelepiped ceramic sintered body and a pair of external electrodes formed at both ends of the ceramic sintered body, and exposed portions excluding the external electrodes on the ceramic sintered body are coated with the glass coat layer. The glass coat layer is applied for the purpose of enhancing moisture resistance and mechanical strength.

The multilayer capacitor of Patent Literature 1 is manufactured by the following method. First, external electrodes are formed at both ends of the ceramic sintered body. Next, the entire surface of the multilayer capacitor including the external electrodes is coated with an oxide glass to form a glass coat layer. Subsequently, abrasive grains composed of $ZrO_2$ powder or the like are injected only to the external electrode portions by a sandblasting method, to grind the glass coat layers on the external electrodes. As a result, the glass coat layers on the external electrodes are removed to complete a multilayer capacitor in which only the ceramic sintered body excluding the external electrodes is coated with the glass coat layer.

In addition JP H08-255701 A (Patent Literature 2) discloses a chip electronic component (chip resistor) partially coated with a resin protective layer (coating material). More specifically, in the chip electronic component in Patent Literature 2, a pair of opposing electrode layers are formed from an upper face to side faces on an alumina substrate, a resistive layer is formed so as to straddle the pair of electrode layers, and only the resistive layer portion is coated with the resin protective layer. The resin protective layer is applied in order to express electric insulation.

The chip electronic component in Patent Literature 2 is manufactured by the following method. First, the upper face portions of the electrode layers are formed on the upper face of the alumina substrate. Next, the resistive layer is formed so as to straddle the electrode layers. Subsequently, a resin paste of an epoxy type or the like is screen-printed so as to completely cover the resistive layer. Subsequently, the screen-printed resin paste is hardened by heating the entire electronic component in e.g. a belt type continuous curing oven, to form a protective layer. Subsequently, the side face portions of the electrode layers which connect with the upper face portions of the electrode layers are formed on the side faces of the alumina substrate. Finally, plating layers are formed on the electrode layers (both the upper face portions and the side face portions) to complete the chip electronic component.

In addition, JP 2014-165184 A (Patent Literature 3) discloses a thermistor element partially coated with a low heat-conductive layer (coating material) made of glass. More specifically, the thermistor element in Patent Literature 3 includes a rectangular parallelepiped ceramic base body and a pair of external electrodes formed at both ends of the ceramic base body, and portions where the ceramic base body is exposed, excluding the external electrodes are coated with the low heat-conductive layer (glass layer). The low heat-conductive layer (glass layer) is applied to make it hard to release heat accumulated in the ceramic base body outward, i.e. to improve a heat-retaining property.

The thermistor element of Patent Literature 3 is manufactured by the following method. First, for example, a ceramic mother substrate having a length of 150 mm, a width of 150 mm, and a thickness of 300 μm is prepared. Next, the mother substrate is diced into e.g. a strip-shaped substrate having a width of 300 μm, a thickness of 300 μm, and a length of 150 mm. Subsequently, the diced strip-shaped substrate is immersed entirely in liquid glass to form a low heat-conductive layer (glass layer) on the entire surface of the strip-shaped substrate. Subsequently, the strip-shaped substrate having the low heat-conductive layer is diced again to obtain e.g. individual ceramic substrates having a width of 300 μm, a thickness of 300 μm, and a length of 600 μm. Each of the obtained ceramic substrates has low heat-conductive layers on 4 faces excluding both end faces. Finally, the external electrodes are formed on both end faces having no low heat-conductive layer to complete the thermistor element.

All of the methods for manufacturing the electronic components described in Patent Literatures 1 to 3 are complicated and exhibit a low productivity. In some cases, the quality of the applied coating material was low.

For example, in the method for manufacturing the multilayer capacitor disclosed in Patent Literature 1, a glass coat layer was formed on the entire surface of the multilayer capacitor including the external electrodes, then the glass coat layers were removed from the external electrodes of each multilayer capacitor by a sandblasting method, and therefore this process was poor in productivity. That is, in sandblasting, it was required that a flat plate-shaped holder made of rubber or the like and having a large number of through holes is prepared, individual multilayer capacitors are accommodated in the through holes, and only the external electrode portions are exposed from the through holes. In this process, it was necessary to protect portions not to be removed on the glass coating layer, and therefore the sandblasting method is poor in productivity and unsuitable for mass production. Furthermore, there was a case that when the individual multilayer capacitors were not properly accommodated in the through holes, the required portions on the glass coating layer were also removed by sandblasting.

Additionally, in the method for manufacturing the chip electronic component (chip resistor) disclosed in Patent Literature 2, first, the resin paste was screen-printed on the alumina substrate, next, the resin paste was hardened by heating the whole electronic component in a belt type continuous curing oven or the like, to form the protective layer, and thus the process was complicated. Furthermore, it took a long time to manufacture. Thus, the method for manufacturing the chip electronic component disclosed in Patent Literature 2 was also poor in productivity.

Additionally, in the method for manufacturing the thermistor element disclosed in Patent Literature 3, the strip-shaped substrate was immersed entirely in liquid glass, the low heat-conductive layer (glass layer) was formed on the entire surface of the strip-shaped substrate, and then the strip-shaped substrate was diced to obtain individual ceramic base bodies. This process was complicated and poor in productivity. Furthermore, there was a case that when the strip-shaped substrate was diced, the low heat-conductive layer formed on the ceramic element body had a breakage, a nick or a crack, and the quality of the coating material (low heat-conductive layer) may be deteriorated.

BRIEF SUMMARY OF THE INVENTION

An object of the present invention is to solve one or more of the aforementioned conventional problems.

In accordance with an aspect of the present invention, an element body is selectively coating with a coating material. The element body has an exposed surface including a selective surface material which is to be coated with the coating material and a non-selected surface material which is not to be coated with the coating material. The selected surface material has different material properties than the non-selected surface material. In one aspect of the invention, the method includes (1) applying a surface modifier only on the surface of the selected surface material, and (2) thereafter coating the surface of the selected surface material to which the surface modifier has been applied with the coating material.

In a further aspect of the invention, the surface modifier is applied to only the surface of the selected surface material, by, at least (1) forming a mask on the surface of the non-selected surface material by immersing the element body entirely in a liquid masking agent which adheres to the non-selected surface material and does not adhere to the selected surface material, (2) applying the surface modifier on the surface of the selected surface material by immersing the element body entirely in the liquid surface modifier, and (3) removing the mask from the surface of the non-selected surface material by immersing the element body entirely in a liquid mask remover.

In another aspect of the invention, the surface modifier is applied only to the selected surface material by at least (1) applying the surface modifier on the surface of both the selected surface material and the surface of the non-selected surface material by immersing the element body entirely in the liquid surface modifier, and (2) thereafter removing the surface modifier applied on the surface of the non-selected surface material.

In aspect of the invention, the surface modifier is removed from the surface of the non-selected surface material by at least melting a surface layer of the non-selected surface material by immersing the element body entirely in a liquid non-selected surface material melting agent which melts the non-selected surface material and does not melt the selected surface material, to remove the surface modifier together with the surface layer.

In yet another aspect of the invention, the surface modifier applied on the surface of the non-selected surface material is removed by at least melting a surface layer of the non-selected surface material by electrifying the non-selected surface material, to remove the surface modifier together with the surface layer.

In preferred embodiments the surface modifier has a functional group, the coating material is made of a resin, and the surface of the selected surface material to which the surface modifier has been applied with the coating material is removed by at least (1) immersing the element body entirely in a catalyst-containing monomer solution, and (2) producing a polymer resin by graft polymerization from the functional group as a polymerization starting point, to coat only the surface of the selected surface material with the coating material.

In preferred embodiments, the surface modifier has a functional group, the coating material is made of a resin, and the surface of the selected surface material to which the surface modifier has been applied with the coating material is removed by at least (1) immersing the element body entirely in a liquid polymer resin and (2) adhering the polymer resin only to the surface of the selected surface material to which the surface modifier having the functional group is applied, to coat only the surface of the selected surface material with the coating material.

In another aspect of the invention, an element body having an exposed surface including a selective surface material which is to be coated with the coating material and a non-selected surface material which is not to be coated with the coating material is prepared before the surface modifier is applied to only on the surface of the selected surface material.

In another aspect of the invention, an element body is prepared or obtained. The element body has an exposed surface including a selective surface material which is to be coated with the coating material and a non-selected surface material which is not to be coated with the coating material. The selected surface material has different material properties than the non-selected surface material is prepared or obtained. The invention selectively coats the element body by at least (1) forming a mask on the surface of the non-selected surface material by immersing the element body entirely in a liquid masking agent which adheres to the non-selected surface material and does not adheres to the selected surface material, (2) coating the surface of the selected surface material with the coating material by immersing the element body entirely in a liquid coating material, and (3) thereafter removing the mask from the surface of the non-selected surface material by immersing the element body entirely in a liquid mask remover.

In a preferred embodiment, the coating material has electric insulation, the selected surface material is made of one or more materials selected from ceramic, glass, glass ceramic and resin, the non-selected surface material is made of a metal, and the non-selected surface material constitutes an electrode of the electronic component, and the coating material is made of a resin.

In another aspect of the invention, an electronic component which includes an element body formed in accordance with one or more of the foregoing methods.

The methods for selectively coating an electronic component with a coating material according to the present invention makes it possible to comprehensively coat element bodies of many electronic components with a coating material, and has high productivity.

Also, the methods for manufacturing an electronic component according to the present invention uses the aforementioned method for selectively coating an electronic component with a coating material according to the present invention, and has high productivity.

DESCRIPTION OF PREFERRED EMBODIMENTS

Figure 1:
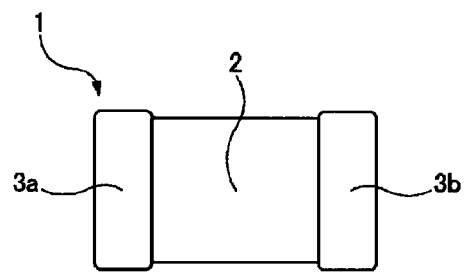
FIGS. 1(A) to 1(C) illustrate an explanatory drawing (front view or sectional view) showing a step implemented in a method for selectively coating an electronic component with a coating material according to Embodiment 1.
Figure 1:
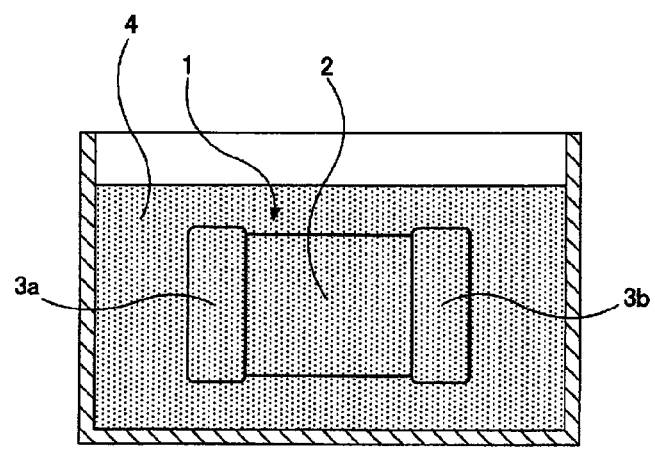
Figure 1:
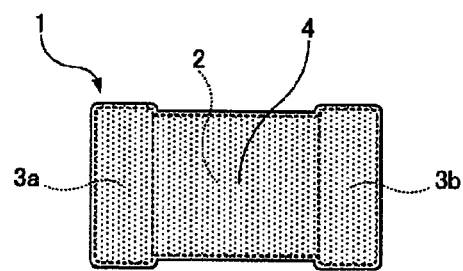
Figure 2:
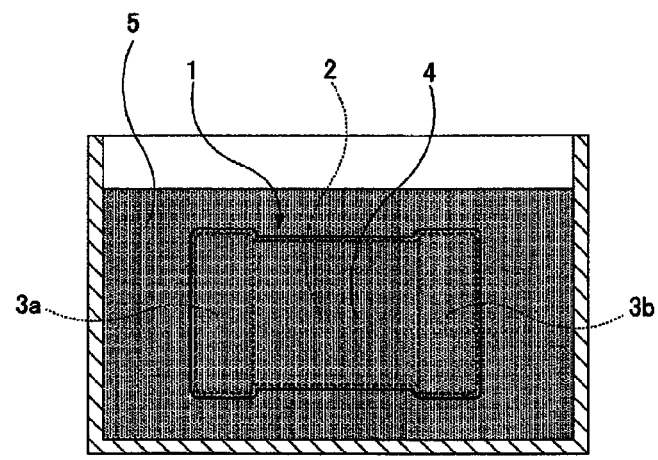
FIGS. 2(D) to 2(E) illustrate an explanatory drawing (front view or sectional view) showing a step following the step of FIG. 1(C), implemented in the method for selectively coating an electronic component with a coating material according to Embodiment 1.
Figure 2:
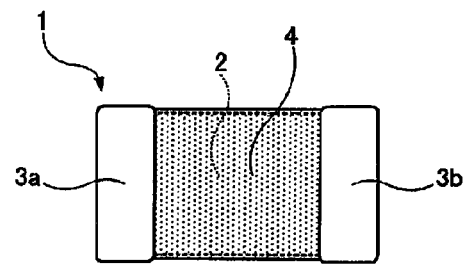
Figure 3:
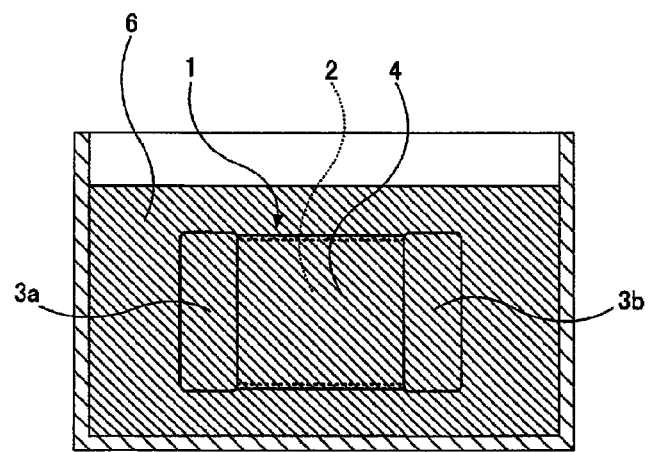
FIGS. 3(F) to 3(G) illustrate an explanatory drawing (front view or sectional view) showing a step following the step of FIG. 2(E), implemented in the method for selectively coating an electronic component with a coating material according to Embodiment 1.
Figure 3:
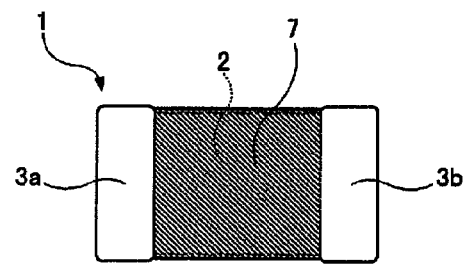
Figure 4:
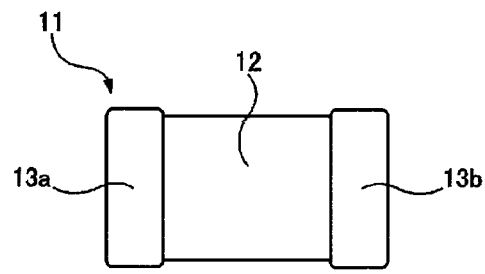
FIGS. 4(A) to 4(C) illustrate an explanatory drawing (front view or sectional view) showing a step implemented in a method for selectively coating an electronic component with a coating material according to Embodiment 2.
Figure 4:
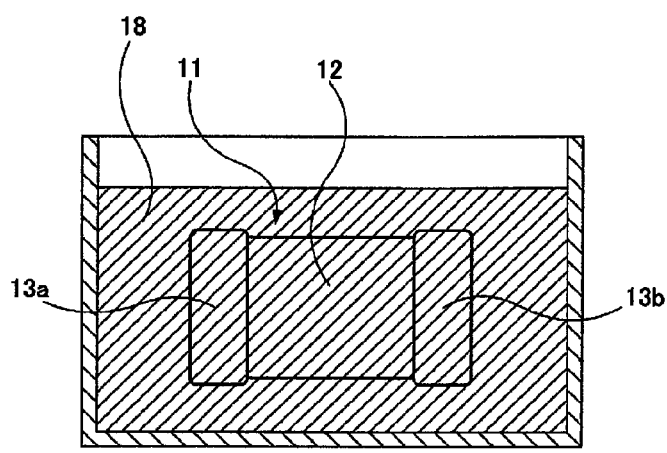
Figure 4:
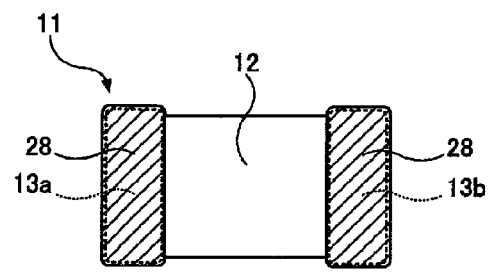
Figure 5:
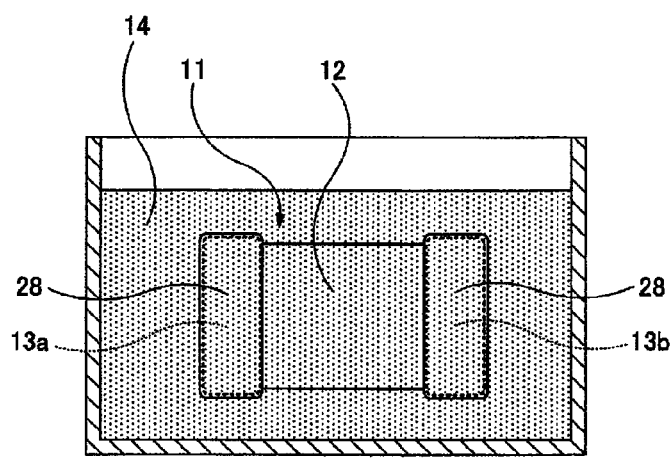
FIGS. 5(D) to 5(E) illustrate an explanatory drawing (front view or sectional view) showing a step following the step of FIG. 4(C), implemented in the method for selectively coating an electronic component with a coating material according to Embodiment 2.
Figure 5:
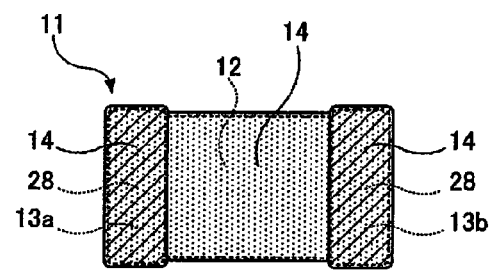
Figure 6:
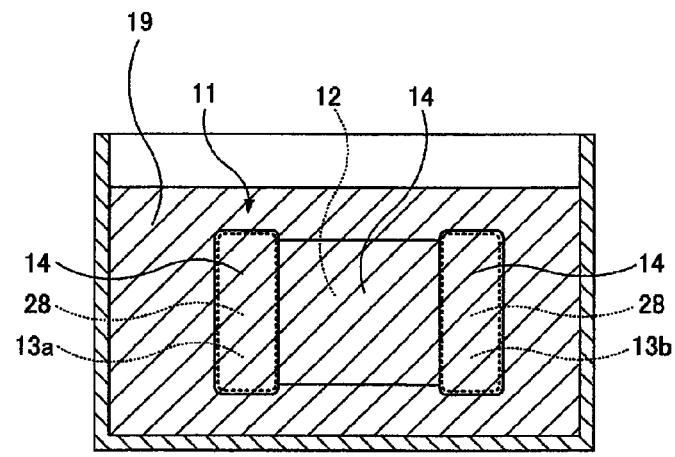
FIGS. 6(F) to 6(G) illustrate an explanatory drawing (front view or sectional view) showing a step following the step of FIG. 5(E), implemented in the method for selectively coating an electronic component with a coating material according to Embodiment 2.
Figure 6:
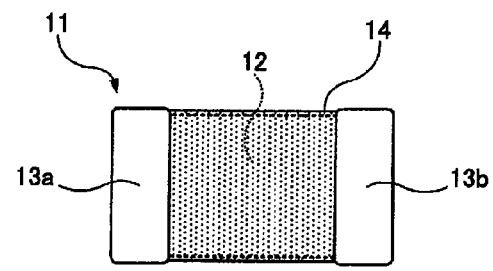
Figure 7:
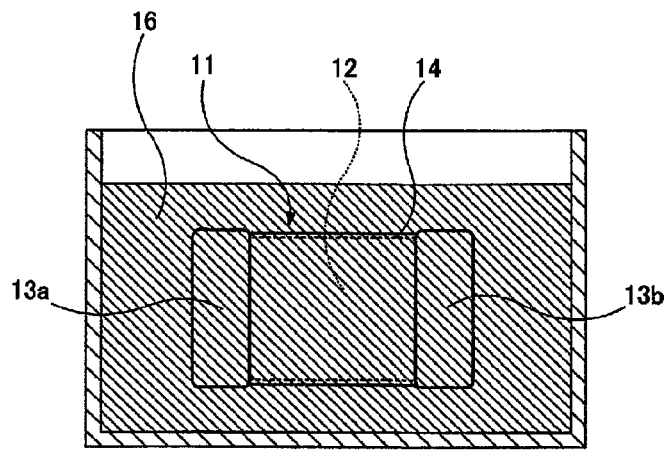
FIGS. 7(H) to 7(I) illustrate an explanatory drawing (front view or sectional view) showing a step following the step of FIG. 6(G), implemented in the method for selectively coating an electronic component with a coating material according to Embodiment 2.
Figure 7:
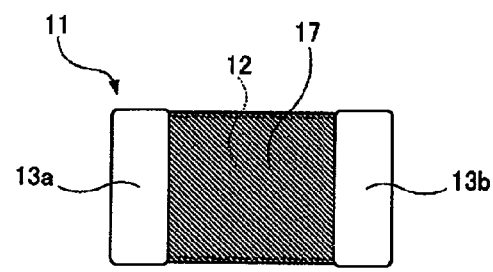
Figure 8:
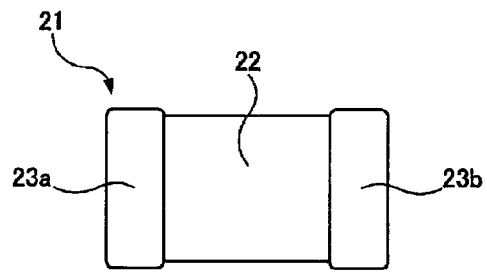
FIGS. 8(A) to 8(C) illustrate an explanatory drawing (front view or sectional view) showing a step implemented in a method for selectively coating an electronic component with a coating material according to Embodiment 3.
Figure 8:
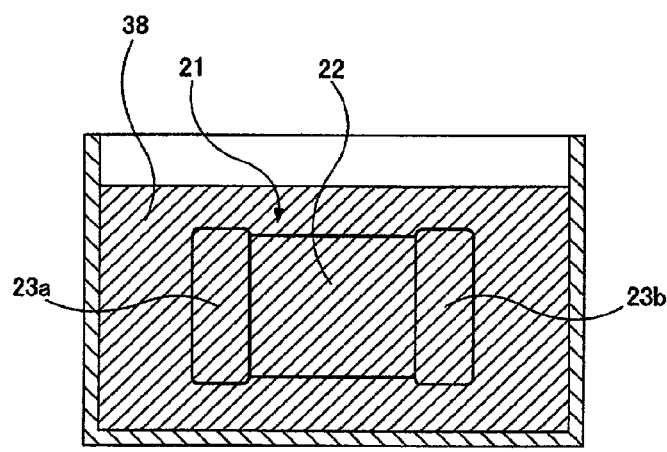
Figure 8:
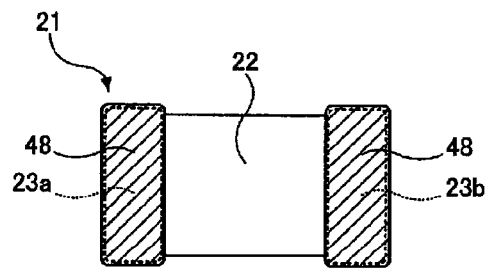
Figure 9:
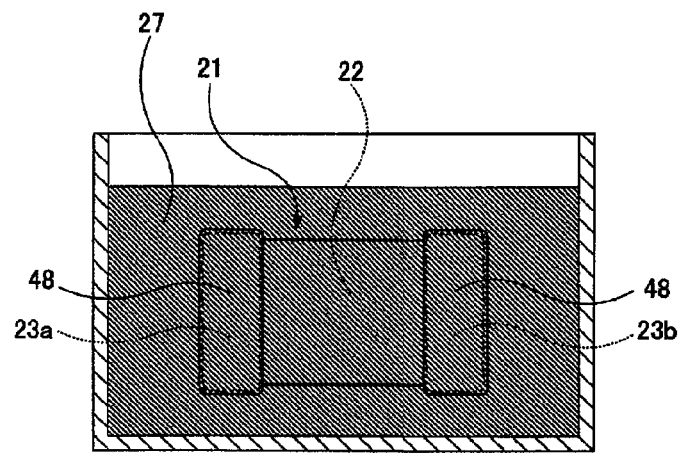
FIGS. 9(D) to 9(E) illustrate an explanatory drawing (front view or sectional view) showing a step following the step of FIG. 8(C), implemented in the method for selectively coating an electronic component with a coating material according to Embodiment 3.
Figure 9:
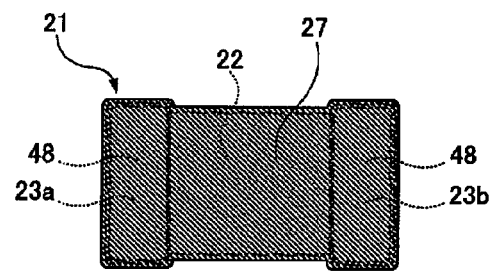

Hereinafter, embodiments for carrying out the present invention will be described with reference to the drawings.

Note that, in each embodiment, an embodiment of the present invention is exemplarily described, and the present invention is not limited to the content of the embodiment. In addition, the present invention can be carried out by combining the contents described in different embodiments, and the contents in this case are also incorporated in the present invention. In addition, the drawings are intended to help the embodiments to be understood, and are not necessarily strictly drawn in some cases. For example, in some cases, a dimensional ratio of the illustrated constituent or a dimensional ratio between the constituents does not coincide with a dimensional ratio of the constituent described in the description. Furthermore, there are cases that the constituent in the description is omitted in the drawing, that the number of the constituents is reduced in the drawing, and the like.

Embodiment 1

FIG. 1(A) to FIG. 3(G) show the steps implemented in the method for selectively coating an electronic component with a coating material according to Embodiment 1.

First, an element body having a surface where a selected surface material and a non-selected surface material are exposed is prepared as shown in FIG. 1(A). In the present embodiment, a multilayer capacitor 1 was prepared as an element body. However, the element body is not limited to the capacitor, and may be another type of electronic component such as a thermistor, a coil, and a resistor.

The multilayer capacitor 1 as an element body includes a rectangular parallelepiped component body 2 made of a ceramic, and a pair of external electrodes 3a and 3b made of a metal and formed on opposite respective ends of the component body 2. In the present embodiment, among these constituents, the ceramic constituting the component body 2 corresponds to the selected surface material, and the metal constituting the external electrodes 3a and 3b corresponds to the non-selected surface material.

In the present embodiment, a ceramic containing barium titanate as a main ingredient is used for the ceramic constituting the component body 2. Furthermore, although not illustrated in the figure, the metal external electrodes 3a and 3b are formed so as to have a multilayer structure, in which e.g. a first layer is a baked electrode layer containing copper, silver or the like as a main ingredient, a second layer is a plating electrode layer containing nickel as a main ingredient, and a third layer is a plating electrode layer containing tin as a main ingredient.

Although not illustrated in the figure, a plurality of layered internal electrodes made of a metal are stacked at intervals in the component body 2. The internal electrode contains e.g. copper or nickel as a main ingredient. The stacked internal electrodes are alternately connected to one external electrode 3a and the other external electrode 3b.

Subsequently, the multilayer capacitor (element body) 1 is immersed entirely in a liquid surface modifier, as shown in FIG. 1(B). In the present embodiment, a silane coupling agent 4 was used as a surface modifier.

As a result, a silane coupling agent (surface modifier) 4 having a functional group with a radical polymerization initiation ability is applied on a surface of the component body (selected surface material) 2 and surfaces of the external electrodes (non-selected surface material) 3a and 3b in the multilayer capacitor 1, as shown in FIG. 1(C).

Subsequently, the multilayer capacitor 1 is immersed entirely in a liquid non-selected surface material melting agent 5 which melts the metal external electrodes (non-selected surface material) 3a and 3b and does not melt the ceramic component body (selected surface material) 2, as shown in FIG. 2(D). As the non-selected surface material melting agent 5, e.g. a dilute aqueous solution of sulfuric acid and hydrogen peroxide, or an etchant of a persulfate aqueous solution can be used. In some cases, this step can provide a secondary effect of improving the solder wettability of the surfaces of the external electrodes 3a and 3b.

As a result, the surface layers of the external electrodes 3a and 3b in the multilayer capacitor 1 are melted, and the silane coupling agent 4 applied to the external electrodes 3a and 3b is removed together with the melted surface layers of the external electrodes 3a and 3b, as shown in FIG. 2(E). That is, the silane coupling agent 4 remains only on the surface of the component body 2 in the multilayer capacitor 1.

Subsequently, the multilayer capacitor 1 is entirely immersed in a catalyst-containing liquid monomer solution 6 (not illustrated in the figure), as shown in FIG. 3(F). For the monomer solution 6, e.g. glycidyl methacrylate, methyl methacrylate, or the like can be used. Incidentally, the monomer solution 6 is not limited to glycidyl methacrylate and methyl methacrylate, and may be a mixture of styrene, and a vinyl monomer combined with glycidyl methacrylate may be another compound. Preferably, the catalyst is composed of a combination of a transition metal and a suitable ligand. The combination may be e.g. a combination of copper halide and a multidentate amine-based compound, and the like.

As a result, graft polymerization is initiated from the functional group of the silane coupling agent 4 applied to the surface of the ceramic component body 2 as a starting point to produce a polymer resin 7 as a coating material on the surface of the component body 2, as shown in FIG. 3(G). That is, an exposed portion of the component body 2 is coated with the polymer resin 7. On the other hand, the portions where the external electrodes 3a and 3b made of the metal as a non-selected surface material are exposed in the multilayer capacitor 1 are not coated with the polymer resin 7. When using glycidyl methacrylate for the monomer solution 6, polyglycidyl methacrylate is produced as the polymer resin 7. Additionally, when using methyl methacrylate for the monomer solution 6, polymethyl methacrylate is produced as the polymer resin 7. The applied polymer resin 7 is formed by controlled graft polymerization, and is assumed to have a homogeneous structure. Furthermore, the choice of monomers allows for coating with the polymer resin having various chemical and mechanical properties.

Incidentally, the production process is not limited to the above, and it is allowed to adopt a process that the surface modification (coating) is first carried out by graft polymerization, and then the surface resin layers of the electrode portions are removed using a non-selected surface material melting agent. Thereby, a higher-quality polymer resin can be formed because the polymer resin layer formed on the surface of the selected material may have a higher resistance to various treatments (including application of a selective melting agent) as compared to the silane coupling agent.

As described above, the selective coating method of an electronic component with a coating material according to Embodiment 1 is completed. That is, the portion where the component body 2 made of a ceramic as the selected surface material is exposed in the multilayer capacitor 1 as the element body is coated with the polymer resin 7 as the coating material, and the portions where the external electrodes 3a and 3b made of a metal as the non-selected surface material are exposed are not coated with the polymer resin 7. The applied polymer resin 7 is produced by graft polymerization and has high quality. In the present embodiment, the coating material made of the applied polymer resin 7 exhibits a function of enhancing the electric insulation, the moisture resistance, the environmental resistance (such as chemical resistance), and the mechanical strength of the multilayer capacitor 1.

Note that, although one element body is coated with the coating material in the present embodiment, the present invention makes it possible to comprehensively coat many element bodies with the coating material. That is, the method for selectively coating an electronic component with a coating material according to the present invention is suitable for mass production of industrial products, and for example, when the method is used for a production process of electronic components, a productivity in the production process of the electronic components can be dramatically improved.

Variation 1 of Embodiment 1

In Variation 1, modification was made to the step that the silane coupling agent 4 as the surface modifier was removed from the external electrodes 3a and 3b as the non-selected surface material in Embodiment 1.

That is, in Embodiment 1, the silane coupling agent (surface modifier) 4 was applied to the surface of the component body (selected surface material) 2 and the surfaces of the external electrodes (non-selected surface material) 3a and 3b in the multilayer capacitor 1 as shown in FIG. 1(C), and then the multilayer capacitor 1 was immersed entirely in the non-selected surface material melting agent 5 as shown in FIG. 2(D) to remove the silane coupling agent 4 applied on the external electrodes 3a and 3b together with the melted surface layers of the external electrodes 3a and 3b. In Variation 1, the above step was modified such that the surface layers of the external electrodes 3a and 3b were melted by electrifying the external electrodes 3a and 3b, to remove the silane coupling agent 4 together with the melted surface layers of the external electrodes 3a and 3b.

More specifically, the multilayer capacitor 1 of which the entire surface was coated with the silane coupling agent 4 was put into a container together with a plurality of metal media, and the surface layers of the external electrodes 3a and 3b were melted by electrifying the external electrodes 3a and 3b of the multilayer capacitor 1 through the metal media, to remove the silane coupling agent 4 applied to the surfaces of the external electrodes 3a and 3b together with the melted surface layers of the external electrodes 3a and 3b.

The other steps in Variation 1 were the same as in Embodiment 1.

Variation 2 of Embodiment 1

In Variation 2, modification was made to the step that the portion where the component body 2 as the selected surface material was exposed in the multilayer capacitor 1 as the element body was coated with the polymer resin 7 as the coating material in Embodiment 1.

That is, in Embodiment 1, the multilayer capacitor 1 was immersed entirely in a catalyst-containing liquid monomer solution 6 as shown in FIG. 3(F), and the polymer resin 7 was produced by graft polymerization from the functional group as a starting point of the silane coupling agent 4 as a surface modifier applied to the surface of the component body 2 as shown in FIG. 3(G). In Variation 2, the above step was modified such that the multilayer capacitor 1 was immersed entirely in a liquid polymer solution (not shown in the figure) instead of the catalyst-containing monomer solution 6, to form a covalent bond between the functional group introduced into the selected surface material and the polymer through treatment with the silane coupling agent. As a result, the portion where the component body 2 coated with the silane coupling agent 4 was exposed in the multilayer capacitor 1 was coated with the polymer resin 7 as the coating material. On the other hand, the portions where the external electrodes 3a and 3b without the silane coupling agent 4 were exposed in the multilayer capacitor 1 were not coated with the polymer resin 7. Since the portions where the external electrodes without the silane coupling agent are exposed do not form covalent bonds with the polymer resin, the portions are coated only by physical adsorption, and the polymer resin can be easily removed. The polymer solution used herein may be e.g. a copolymer of glycidyl methacrylate and methyl methacrylate or styrene. However, the polymer solution is not limited to this copolymer, and may be a copolymer capable of forming a covalent bond by reaction with a functional group derived from the silane coupling agent introduced into the selected surface material.

The other steps in Variation 2 are the same as in Embodiment 1.

Embodiment 2

FIG. 4(A) to FIG. 7(I) illustrate the steps implemented in the method for selectively coating an electronic component with a coating material according to Embodiment 2.

First, a multilayer capacitor 11 is prepared as an element body, as shown in FIG. 4(A). The multilayer capacitor 11 as the element body includes a component body 12 made of a ceramic as a selected surface material, and a pair of external electrodes 13a and 13b made of a metal as a non-selected surface material.

Next, the multilayer capacitor 11 is immersed entirely in a liquid masking agent 18 which adheres to the metal external electrodes 13a and 13b and does not adhere to the ceramic component body 12, as shown in FIG. 4(B). As the masking agent 18 which adheres only to the metal external electrodes 13a and 13b, e.g. a thiol compound, an amine, or the like can be used.

As a result, masks 28 are formed only on the surfaces of the external electrodes 13a and 13b in the multilayer capacitor 11, as shown in FIG. 4(C).

Subsequently, the multilayer capacitor 11 is immersed entirely in a silane coupling agent 14 as a surface modifier, as shown in FIG. 5(D).

As a result, the silane coupling agent 14 having a functional group is applied on the surface of the component body 12 and the surfaces of the masks 28 formed on the external electrodes 13a and 13b in the multilayer capacitor 11, as shown in FIG. 5(E). However, in some cases, the silane coupling agent 14 is not applied on the surfaces of the masks 28 (no adhesion), or only a small amount of the silane coupling agent 14 is applied on the surfaces of the masks 28 (no adhesion). Since this interaction results mainly from physical adsorption, the silane coupling agent 14 can be easily removed by an appropriate treatment as needed.

Subsequently, the multilayer capacitor 11 is immersed entirely in a liquid mask remover 19, as shown in FIG. 6(F). As the mask remover 19, e.g. a dilute aqueous solution of sulfuric acid and hydrogen peroxide, or an etchant of a persulfate aqueous solution can be used.

As a result, the masks 28 are removed from the surfaces of the external electrodes 3a and 3b, as shown in FIG. 6(G). That is, the silane coupling agent 14 remains only on the surface of the component body 12 in the multilayer capacitor 11.

Subsequently, the multilayer capacitor 11 is immersed entirely in a catalyst-containing liquid monomer solution 16, as shown in FIG. 7(H).

As a result, graft polymerization is initiated from the functional group as a starting point in the silane coupling agent 14 applied on the surface of the ceramic component body 12 to produce a polymer resin 17 on the surface of the component body 12 as the selected surface basis material, as shown in FIG. 7(I). On the other hand, the polymer resin 17 is not produced on the surfaces of the external electrodes 13a and 13b as the non-selected surface materials.

In this way, the method for selectively coating an electronic component with a coating material according to Embodiment 2 is completed.

Embodiment 3

FIG. 8(A) to FIG. 10(G) illustrate the steps implemented in the method for selectively coating an electronic component with a coating material according to Embodiment 3.

First, a multilayer capacitor 21 is prepared as an element body, as shown in FIG. 8(A). The multilayer capacitor 21 as the element body includes a component body 22 made of a ceramic as a selected surface material, and a pair of external electrodes 23a and 23b made of a metal as a non-selected surface material.

Next, the multilayer capacitor 21 is immersed entirely in a liquid masking agent 38 which adheres to the metal external electrodes 23a and 23b and does not adhere to the ceramic component body 22, as shown in FIG. 8(B). As the masking agent 38, a thiol compound, an amine or the like can be used, as described above.

As a result, masks 48 are formed only on the surfaces of the external electrodes 23a and 23b in the multilayer capacitor 21, as shown in FIG. 8(C). Subsequently, a silane coupling agent having a functional group capable of forming a covalent bond with the polymer resin for immersion is applied on the entire surface of the multilayer capacitor (step not shown).

Subsequently, the multilayer capacitor 21 is immersed entirely in a liquid polymer resin 27, as shown in FIG. 9(D).

As a result, the surface of the portion where the component body 22 is exposed and the surfaces of the masks 48 formed on the external electrodes 23a and 23b in the multilayer capacitor 21 are coated with the polymer resin 27 as a coating material, as shown in FIG. 9(E). If the silane coupling agent is not sufficiently applied on (no adhesion) the surfaces of the masks 48, the surfaces of the masks 48 are not coated with the polymer resin 27 in some cases.

Figure 10F:
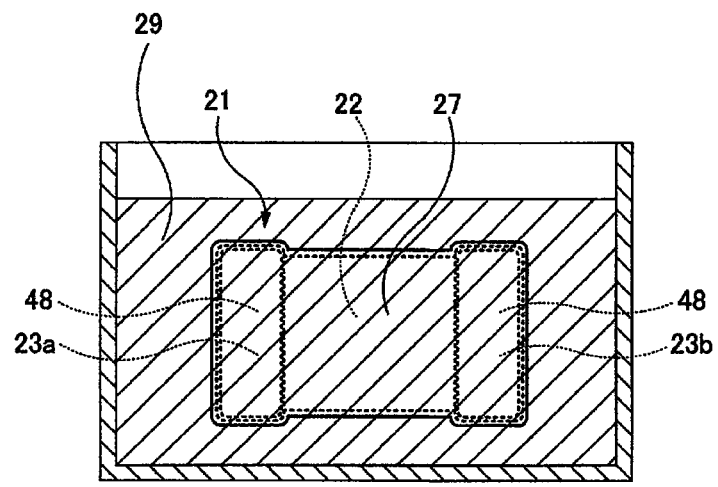
FIGS. 10(F) to 10(G) illustrate an explanatory drawing (front view or sectional view) showing a step following the step of FIG. 9(E), implemented in the method for selectively coating an electronic component with a coating material according to Embodiment 3.

Subsequently, the multilayer capacitor 21 is immersed entirely in a liquid mask remover 29, as shown in FIG. 10(F).

Figure 10G:
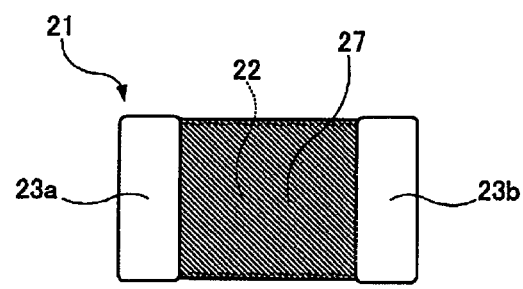

As a result, the masks 48 are removed from the surfaces of the external electrodes 23a and 23b, as shown in FIG. 10(G). That is, the polymer resin 27 as a coating material remains only on the surface of the component body 22 made of a ceramic as a selected surface material in the multilayer capacitor 21 to coat the surface of the component body 22. On the other hand, the surfaces of the external electrodes 23a and 23b made of a metal as a non-selected surface material in the multilayer capacitor 21 are not coated with the polymer resin 27.

Incidentally, a portion capable of reacting only with the functional group of the silane coupling agent (i.e. capable of forming a covalent bond with the ceramic surface) is previously introduced into the polymer resin 27, and a portion different from the above portion is provided with the mask remover, and then resinified by crosslinking the resin layer of the ceramic surface (more precisely, the polymer layer before crosslinking), to more remarkably exhibit the effect of the mask remover.

As described above, the method for selectively coating an electronic component with a coating material according to Embodiment 1 (including Variation 1 and Variation 2), Embodiment 2, and Embodiment 3 has been explained. However, the present invention is not limited to the aforementioned contents, and can be variously modified in accordance with the gist of the present invention.

For example, although the capacitor was used as an electronic component in the aforementioned embodiments, the electronic component is not limited to the capacitor, and may be another type of electronic component such as a thermistor, a coil, and a resistor.

In addition, although the ceramic was used as a selected surface material in the aforementioned embodiments, the selected surface material is not limited to the ceramic, and may be another type of materials such as glass, glass ceramic, resin, and metal.

Although the metal was used as a non-selected surface material in the aforementioned embodiments, the non-selected surface material is not limited to the metal, and may be another type of materials such as ceramic, glass, glass ceramic and resin.

In addition, although the silane coupling agent was used as a surface modifier in the aforementioned embodiments, the material of the surface modifier may also be any material. Other surface modifiers may be e.g. a phosphonic acid derivative, and the like.

Furthermore, although the resin was used as a coating material in the aforementioned embodiment, the coating material may also be any material, and may be another type of material such as ceramic, glass, glass ceramic, and metal.

Also, the coating material to be applied may have any functions. For example, the coating material may have a function of developing electric insulation, a function of enhancing moisture resistance, a function of enhancing environmental resistance (chemical resistance etc.), a function of enhancing mechanical strength, a function of enhancing heat dissipation, a function of enhancing heat-retaining property, and a function of coloring the material for the purpose of identifying types, preventing contamination and providing designability, and the like.

REFERENCE SIGNS LIST 1, 11, 21: Electronic component (element body)
2, 12, 22: Component body (selected surface material; ceramic)
3a, 3b, 13a, 13b, 23a, 23b: External electrode (non-selected surface material; metal)
4, 14: Silane coupling agent (surface modifier)
5: Etchant (non-selected surface material melting agent)
6, 16: Monomer solution
7, 17, 27: Polymer resin (coating material)
18, 38: Masking agent
19, 29: Mask remover
28, 48: Mask

The invention claimed is:

1. A method for selectively coating an element body with a coating material, the element body having an outer surface including a first portion that is to be coated with the coating material and a second portion that is not to be coated with the coating material, the first portion being made of a first material, the second portion being made of a second material, the first and second materials having different properties, the method comprising:
  (a) applying a coupling agent on the first and second portions of the outer surface by immersing the element body entirely in the coupling agent;
  (b) removing the coupling agent from the second portion of the outer surface by at least melting a surface layer of the second material by immersing the element body entirely in a melting agent which melts the second material and does not melt the first material, to remove the coupling agent from the second portion of the outer surface; and thereafter
  (c) coating the coupling agent located on the first portion of the outer surface with a solution that reacts with the coupling agent to form the coating material.

2. The method in accordance with claim 1, wherein the element body is an electric component.

3. The method in accordance with claim 2, wherein the first portion of the outer surface is a ceramic material.

4. The method in accordance with claim 1, wherein the solution contains a catalyst which promotes it's reaction with the coupling agent.

5. The method in accordance with claim 1, wherein:
  the coupling agent has a functional group;
  the coating material is a polymer resin; and
  the solution comprises a catalyst-containing monomer which reacts with the coupling agent to form the resin coating material.

6. The method in accordance with claim 5, wherein the solution is applied to the first and second portions of the outer surface by immersing the element body in a catalyst-containing monomer solution.

7. The method in accordance with claim 5, wherein graft polymerization is initiated from the functional group as a starting point to produce the polymer resin.

8. The method in accordance with claim 7, wherein the polymer resin is formed by controlled graft polymerization.

9. The method in accordance with claim 1, wherein the coating material is electrically insulative.

10. The method in accordance with claim 1, wherein:
the element body is an electronic component;
the first material is made of one or more materials selected from ceramic, glass, glass ceramic and resin;
the second material is made of a metal and constitutes an electrode of the electronic component; and
the coating material is a resin.

11. A method for manufacturing an electronic component comprises an element body, wherein the element body is formed using the method of claim 1.

12. A method in accordance with claim 1, wherein the coupling agent is a silane coupling agent or a phosphonic acid derivative.

* * * * *